United States Patent [19]

Hosoki et al.

[11] Patent Number: 4,786,922
[45] Date of Patent: Nov. 22, 1988

[54] ELECTRON BEAM RECORDING AND REPRODUCING APPARATUS

[75] Inventors: Shigeyuki Hosoki, Hachioji; Keiji Takata, Koganei; Toshiyuki Aida, Chofu; Sumio Hosaka, Nishitama, all of Japan

[73] Assignee: Hitachi, Ltd., Tokyo, Japan

[21] Appl. No.: 13,798

[22] Filed: Feb. 12, 1987

[30] Foreign Application Priority Data

Feb. 17, 1986 [JP] Japan .................................. 61-30819

[51] Int. Cl.⁴ .............................................. G01J 15/00
[52] U.S. Cl. ................................... 346/158; 346/153.1
[58] Field of Search ........... 346/158, 159, 155, 139 C, 346/153.1; 369/101, 143, 146, 173

[56] References Cited

U.S. PATENT DOCUMENTS 2,726,289 12/1955 Evans ................................. 369/101

FOREIGN PATENT DOCUMENTS 221846 5/1983 Japan ................................. 369/101

Primary Examiner—Arthur G. Evans
Attorney, Agent, or Firm—Antonelli, Terry & Wands

[57] ABSTRACT

An electron beam recording and reproducing apparatus which radiates the electron beam emitted from a needle cathode to a disc for recording and reproduction is disclosed. The needle cathode moves on the disc. A magnetic field is applied in the axial direction of the needle cathode in order to converge and radiate the electron beam emitted from the needle cathode to the disc.

8 Claims, 2 Drawing Sheets

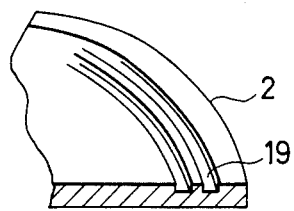
FIG. 2A
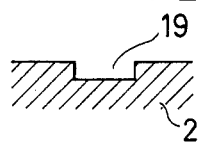 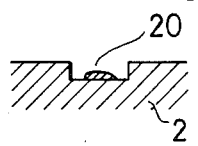 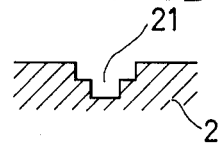
FIG. 2B  FIG. 2C  FIG. 2D
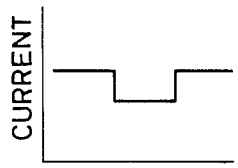 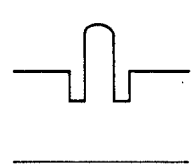 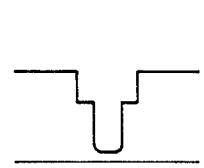
FIG. 2E  FIG. 2F  FIG. 2G
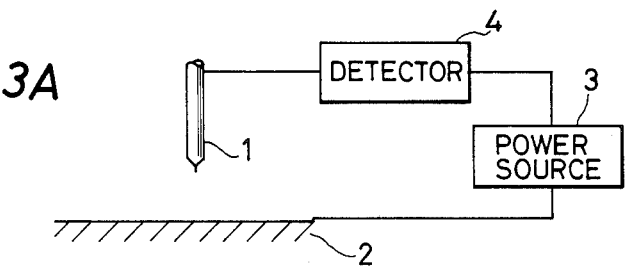
FIG. 3A

ELECTRON BEAM RECORDING AND REPRODUCING APPARATUS

BACKGROUND OF THE INVENTION

This invention relates to a recording and reproducing apparatus utilizing electron beams, and more particularly to an electron beam apparatus suitable for writing and reading high density digital signals.

Various proposals have been made in the past on recording apparatuses utilizing an electron beam. The greatest advantage brought forth by the utilization of the electron beam lies in high density recording which makes it possible to effect recording in a unit smaller than the wavelength of light by fine electron beams. In practice, however, the scale of the apparatus becomes extremely great in order to finely converge and deflect the electron beam and to accomplish high density recording or reproduction. In other words, even if high density integration of memory devices is attained, there would be no merit if the apparatus itself using them remains great in size. To solve this problem, an attempt has been made to seal the recording device and the convergent electron beam system into an electron tube as described, for example, in G.E. R&D Review, 1977, p 12-15. In this case, too, the recording density as viewed from the user's side is one that is averaged by the overall capacity of the tube.

Another proposal is described in Japanese Patent Laid-Open No. 221846/1984. This prior art is based upon the concept of a conventional magnetic or optical disc device and enlarges the scale of an apparatus constituting the convergent electron beam system and enlarges the recording device itself, too. A disc is rotated in vacuum and the fine electron beam is deflected for recording and reproduction. The electro-optical system used in this prior art is equivalent to an electron beam lithography system used for fine-patterning of semiconductors, or the like. In other words, the electron beam is converged (a) as finely as possible after obtaining a necessary current for exposure and scans it (b) as quickly as possible and (c) over area as wide as possible at a certain constant position on a mechanical sample moving device.

Therefore, even if the electron beam can be easily converged to about 100 Å as in a scanning electron microscope, recording and reproduction would require several hundreds of hours of time if the conditions (b) and (c) are not taken into consideration. In order for the recording by electron beam to be obviously superior to the recording density by light, a recording area of about 0.1 $\mu$m per bit must be secured, and in this point, the prior art method described above involves a critical problem. Suppose an electron beam having a diameter of 0.1 $\mu$m is deflected by a final convergent(objective) lens having a focal distance of 10 to 20 cm in the electron beam lithography system described above, the deflection quantity on the sample surface is up to 10 mm due to the aberration blur that occurs due to deflection. This means that the radius of the disc used for accomplishing high density recording in this prior art example is about 10 mm.

As described above, whereas the fineness of the electron beam has been stressed and the attempt has been made to improve the density of the recording device, the increase in the recording capacity has been rather neglected.

SUMMARY OF THE INVENTION

It is therefore an object of the present invention to provide an electron beam recording and reproducing apparatus which accomplishes high density recording and reproduction by the electron beam and at the same time, accomplishes also a high capacity corresponding to the high density.

To accomplish the object described above, the present invention provides an electron beam recording and reproducing apparatus which comprises a needle cathode, a disc disposed in such a manner as to face the needle cathode with a fine gap therebetween, means for moving the needle cathode on the disc, means for rotating the disc and means for applying a magnetic field in the axial direction of the needle cathode, wherein the electrons emitted from the needle cathode to the disc are used as means for recording and reproduction.

Here, the term "electron beam recording and reproducing apparatus" include those apparatuses which make recording or reproduction alone and those which make both recording and reproduction.

To accomplish the object described, it is an essential condition that the fine electron beam utilized for recording and reproduction can be radiated to an arbitrary position of a disc having a large area without requiring a large deflection quantity of the electron beam. In other words, what is required is the technique which permits a primary signal source such as a magnetic head of a magnetic disc or a semiconductor or photo-transistor of an optical disc and a secondary signal detector for reproduction to respond to each other with high responsibility, and to select an arbitrary position on a disc having a large area.

Such technique cannot be accomplished easily by reducing the size of a conventional electro-optical system, but can be accomplished by the invention described below.

When a voltage is applied between a needle cathode whose tip is sharpened and an anode made of a conductor and disposed in such a manner as to face the cathode, a field emission electron is emitted from the cathode. When the needle cathode and the anode are brought close to each other in a vacuum gap of 0.1 $\mu$m the expansion of the electron beam on the anode surface is almost equivalent to the vacuum gap, that is, about 0.1 $\mu$m. If the anode is replaced by a disc on the basis of this principle, it becomes possible to scan mechanically the light-weight needle cathode without using the conventional optical system. However, it is practically difficult to keep the vacuum gap of about 0.1 $\mu$m between the disc and the needle cathode when a large disc is rotated, and the electron distribution on the disc is reduced by the following method even when the vacuum gap is in the range of from 1 to 10 $\mu$m.

Namely, a magnetic field is applied in the axial direction of the needle cathode to converge the electron distribution having the expansion equivalent to that of the vacuum gap on the disc.

BRIEF DESCRIPTION OF THE DRAWINGS

FIG. 2A is a perspective view of a track on a disc;

FIG. 2B through FIG. 2D are sectional views showing other examples of the tracks.

FIG. 2E through FIG. 2G are diagrams showing detection waveforms;

FIG. 3A is an explanatory view useful for explaining the principle of reproduction in accordance with the present invention.

DESCRIPTION OF THE PREFERRED EMBODIMENT

Figure 1:
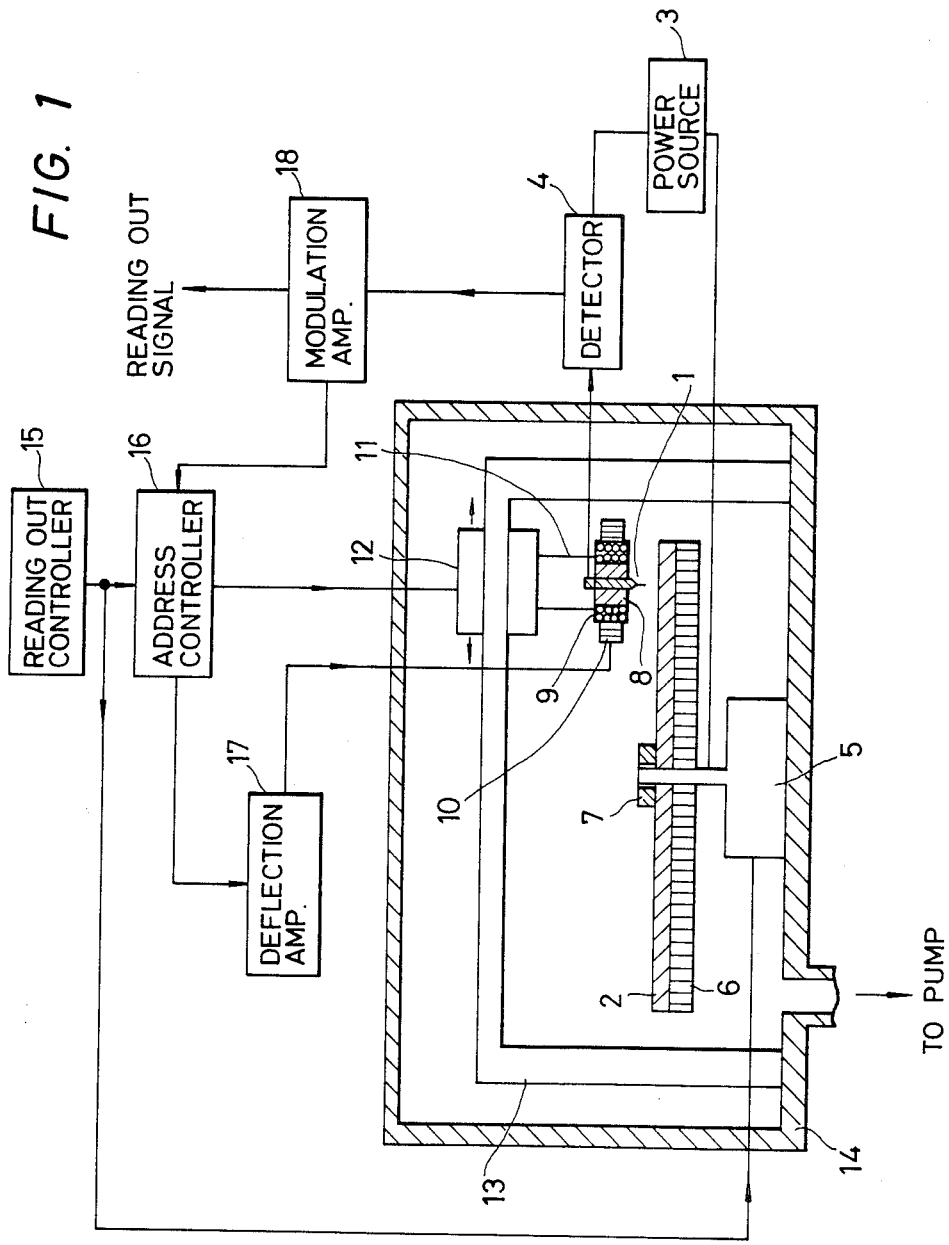
FIG. 1 is a transverse sectional view of an electron beam recording and reproducing apparatus in accordance with one embodiment of the present invention.

Hereinafter, one embodiment of the present invention will be described with reference to FIG. 1.

In the drawing, a needle cathode 1 is supported by a level controller 11 in such a manner as to keep a predetermined level or a fine vacuum gap of 1 to 10 μm between it and a disc 2 which is supported by a disc fixing device 7 on a disc table 2 connected directly to and rotated by a rotating device 5. When a voltage is applied between the needle cathode 1 and the disc 2 by a power source 3, a current flows due to the field emission electrons emitted from the needle cathode 1 and is detected by a detector 4. At this time, a magnetic pole 8 disposed around the needle cathode 1 has a magnetic flux in the axial direction of the needle cathode 1 due to the application of a current to a coil 9 disposed further around the outer circumference of the magnetic pole 8. Accordingly, the electrons emitted from the needle cathode 1 are converged and radiated to the disc 2.

When an instruction signal is generated from a read-out controller 15, addressing is made by a moving mechanism 12 which is mounted to a support means 13 driven by the rotating device and an addressing controller 16, and the current detected by the detector 4 is amplified or modulated by a modulation amplifier 18 in accordance with a write system and is turned into a desired read-out signal. In this case, the interior of a vacuum vessel 14 is evacuated by an exhaust pump.

FIG. 2 shows a signal recording method. As shown in FIG. 2A, concentric or spiral tracks 19 are formed on the disc surface. FIGS. 2B, 2C and 2D show the sectional shapes of the tracks while FIGS. 2E, 2F and 2G show the detection current obtained when the moving mechanism 12 is moved without rotating the disc 2 and correspond to FIGS. 2B, 2C and 2D, respectively. FIG. 2B shows the sectional shape of one track, which is about 0.2 μm wide and 0.01 μm deep. FIG. 2C shows the section of a signal recording unit 20 which is 0.1 μm in diameter and about 0.005 to 0.01 μm thick and is formed in the track. If the signal recording unit 20 is made of a material having a smaller work function than that of the disc 2, the detection current such as shown in the drawing can be obtained. FIG. 2D shows the case where the signal recording unit 21 is a hole formed in the track 19, and the depth of this hole may be equal to, or greater than, the depth of the track 19. Addressing is made by use of this track 19 as the reference, and the rotating device 5 and the moving mechanism 12 may make control in the unit about the width of the track (up to 0.2 μm in this embodiment). Finer position adjustment is made by an electromagnetic deflector (in two orthogonal directions) by controlling a deflection amplifier 17.

Figure 3B:
FIG. 3B through FIG. 3E are sectional views showing examples of the disc surface shape.
Figure 3C:
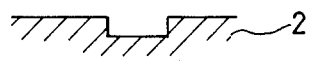
Figure 3D:
Figure 3E:

FIG. 3A shows in detail the reproduction method. The needle cathode 1 and the disc 2 are disposed in such a manner as to face each other and after the voltage is applied by the power source, the radiation current is detected by the detector 4. Any signals can be read out from this detection signal by relying upon the shape on the disc surface such as corrugations or upon the change of the work functions resulting from the difference of the materials. FIGS. 3B through 3E show the reading method more definitely. FIGS. 3B and 3C show the case where the signal is read out from the surface shape with the material being the same, FIG. 3D shows the case where a material 22 having a different work function exists on the disc substrate even in the form of a single atomic layer and FIG. 3E shows the case where the material 22 having a different work function exists, though no step exists on the disc surface.

Besides the radiation current, it is also possible to use X-rays, luminescence, secondary electrons, and the like, as the detection signal described above. In most cases, the material 22 described above may merely be different from the material of the disc 2.

In the present invention, the needle cathode plays the following two roles. First, it operates as a primary radiation source for the recording to the disc, and a magnetic field is applied in the axial direction of the needle cathode so that the electron distribution on the disc can be converged even when the vacuum gap between the disc and the needle cathode is from 1 to 10 μm. Second, the needle cathode detects the recording signals appearing in the radiation current at the time of reproduction. In order to detect the signals at any positions on the disc, the needle cathode can have the function of position designation by combining the rotation of the disc with the linear motion of the needle cathode in a certain radius vector of the disc.

In the manner described above, the recorded signals of the disc can be read out. Since many writing methods are available, not all of them can be practised but so long as the methods are of the system which uses the electron beam, they can all be employed.

The embodiment of the present invention described above provides the following effects. (1) Since it uses the fineness of the electron beam, it can make high density recording of about $10^9$ bit/cm$^2$. Since the present invention does not deflect the electron beam at a great angle as has been made in the conventional apparatuses, the convergent electron beam remains unchanged in size. Accordingly, (2) the recording/reproduction capacity can be enlarged at the same time irrespective of the size of the disc, except for the limitation of the mechanical motion such as the rotation of the disc and the linear motion of the needle cathode.

Since the embodiment of the invention does not need the electro-optical column that has been necessary in the conventional apparatuses, the apparatus can be constructed easily as a whole and evacuation can be made by use of an exhaust pump having a small capacity.

Since the present invention has the construction described above, it can accomplish the high recording and reproducing density by use of the electron beam as well as the high density recording and reproduction.

What is claimed is:

1. An electron beam recording and reproducing apparatus comprising:
   a needle cathode;
   a disc disposed in such a manner as to face said needle cathode with a fine gap therebetween;
   means for moving said needle cathode with respect to a surface of said disc;
   means for rotating said disc; and
   means for applying a magnetic field in the axial direction of said needle cathode in order to converge an electron beam emitted from said needle cathode onto said disc;

wherein the electron emitted from said needle cathode to said disc is used as means for recording and reproduction.

2. An electron beam recording and reproducing apparatus according to claim 1, wherein said means for applying a magnetic field is constituted integrally with said needle cathode.

3. An electron beam recording and reproducing apparatus according to claim 1, which further comprises means for deflecting the electron beam emitted from said needle cathode.

4. An electron beam recording and reproducing apparatus according to claim 3, wherein said deflection means is constituted integrally with said needle cathode.

5. An electron beam recording and reproducing apparatus according to claim 1, wherein level control means is disposed between said needle cathode and said moving means for moving said needle cathode in order to control the gap between said needle cathode and said disc.

6. An electron beam recording and reproducing apparatus according to claim 1, wherein said moving means for said needle cathode includes a support and a moving mechanism mounted to said support.

7. An electron beam recording and reproducing apparatus according to claim 1, wherein corrugations corresponding to recording signals are formed on the disc surface.

8. An electron beam recording and reproducing apparatus according to claim 1, wherein different work functions are provided on the disc surface in such a manner as to correspond to the recording signals.

* * * * *